United States Patent
Kuno

(10) Patent No.: US 7,728,851 B2
(45) Date of Patent: Jun. 1, 2010

(54) REPRODUCING APPARATUS CAPABLE OF REPRODUCING PICTURE DATA

(75) Inventor: Shinji Kuno, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 206 days.

(21) Appl. No.: 11/326,108

(22) Filed: Dec. 30, 2005

(65) Prior Publication Data

US 2006/0176312 A1    Aug. 10, 2006

(30) Foreign Application Priority Data

Jan. 4, 2005    (JP) .............................. 2005-000250

(51) Int. Cl.
G09G 5/00    (2006.01)
G09G 5/02    (2006.01)
(52) U.S. Cl. ...................... 345/629; 345/592; 345/612; 345/638
(58) Field of Classification Search ................. 345/629, 345/589, 592, 593, 612, 634, 636–641
See application file for complete search history.

(56) References Cited

U.S. PATENT DOCUMENTS

| | | | |
|---|---|---|---|
| 5,027,212 A | 6/1991 | Marlton et al. | |
| 5,809,245 A | 9/1998 | Zenda | |
| 5,890,190 A | 3/1999 | Rutman | |
| 5,912,710 A * | 6/1999 | Fujimoto | 348/445 |
| 6,128,015 A | 10/2000 | Zenda | |
| 6,230,209 B1 | 5/2001 | Zenda | |
| 6,311,204 B1 * | 10/2001 | Mills | 718/100 |
| 6,356,277 B1 | 3/2002 | Yajima et al. | |
| 6,377,309 B1 * | 4/2002 | Ito et al. | 348/554 |
| 6,463,208 B1 | 10/2002 | Kim | |
| 6,486,922 B1 | 11/2002 | Ueno | |
| 6,552,750 B1 * | 4/2003 | Suen et al. | 348/561 |
| 6,606,127 B1 | 8/2003 | Fang et al. | |
| 6,828,987 B2 * | 12/2004 | Swan | 345/660 |

(Continued)

FOREIGN PATENT DOCUMENTS

JP    08-205092    8/1996

(Continued)

OTHER PUBLICATIONS

An English Translation of Notification of Reasons for Rejection mailed by Japan Patent Office for Japanese Patent Application No. 2005-000247 on May 12, 2009.

(Continued)

*Primary Examiner*—Hau H Nguyen
(74) *Attorney, Agent, or Firm*—Knobbe Martens Olson & Bear, LLP

(57) ABSTRACT

A reproducing apparatus includes a graphics processing unit that outputs graphics data of an RGB color space, a video decoder that outputs video data of a YUV color space, a conversion unit that converts a color space of the graphics data from the RGB color space to the YUV color space, a blending process unit that executes a blending process in which the graphics data that is converted to the YUV color space and the video data of the YUV color space are blended on the YUV color space, and a picture data output unit that outputs picture data, which is obtained by the blending process, to a display apparatus.

8 Claims, 11 Drawing Sheets

U.S. PATENT DOCUMENTS

| | | | |
|---|---|---|---|
| 6,912,350 B1 | 6/2005 | Vasquez | |
| 6,947,485 B2* | 9/2005 | Owen et al. | 375/240.16 |
| 7,035,531 B2 | 4/2006 | Tzou | |
| 7,068,324 B2 | 6/2006 | Englert | |
| 7,136,078 B2* | 11/2006 | Liao et al. | 345/604 |
| 7,539,391 B2 | 5/2009 | Cavallerano et al. | |
| 2003/0194213 A1 | 10/2003 | Schultz et al. | |
| 2004/0001402 A1 | 1/2004 | Hora | |
| 2004/0207755 A1* | 10/2004 | Lin | 348/453 |
| 2004/0233215 A1 | 11/2004 | Dawson | |
| 2005/0122341 A1 | 6/2005 | MacInnis | |
| 2005/0185928 A1 | 8/2005 | Kang et al. | |
| 2005/0281342 A1 | 12/2005 | Aggarwal et al. | |

FOREIGN PATENT DOCUMENTS

| | | |
|---|---|---|
| JP | H09-046722 A | 2/1997 |
| JP | 10-145780 | 5/1998 |
| JP | 10-320922 | 12/1998 |
| JP | 11-053580 | 2/1999 |
| JP | H11-168701 A | 6/1999 |
| JP | 11-203444 | 7/1999 |
| JP | 2000-305546 | 2/2000 |
| JP | 2000-324419 A | 11/2000 |
| JP | 2001-053956 A | 2/2001 |
| JP | 2002-199277 A | 7/2002 |
| JP | 2002-297198 | 10/2002 |
| JP | 2002-325171 | 11/2002 |
| JP | 2003-162276 A | 6/2003 |
| JP | 2003-179850 A | 6/2003 |
| JP | 2003-224862 | 8/2003 |
| JP | 2004-328226 A | 11/2004 |
| JP | 2004-328718 A | 11/2004 |
| JP | 2001-320673 A | 11/2006 |
| WO | WO 2004/049710 A1 | 6/2004 |
| WO | WO 2004/090860 | 10/2004 |

OTHER PUBLICATIONS

An English Translation of Notification of Reasons for Rejection mailed by Japan Patent Office for Japanese Patent Application No. 2005-000246 on May 26, 2009.

An English Translation of Notification of Reasons for Rejection mailed by Japan Patent Office for Japanese Patent Application No. 2005-000248 on May 12, 2009.

An English Translation of Final Notice of Rejection mailed by the Japan Patent office for Japanese Patent Application No. 2005-000247 on Sep. 8, 2009.

An English Translation of Final Notice of Rejection mailed by the Japan Patent office for Japanese Patent Application No. 2005-000246 on Sep. 8, 2009.

An English Translation of Notice of Reasons for Rejection mailed by the Japan Patent Office for Japanese Patent Application No. 2005-000248 on Aug. 18, 2009.

Office Action dated Dec. 3, 2007 issued in U.S. Appl. No. 11/326,105 in 14 pages.

Amendment filed Mar. 31, 2008 in U.S. Appl. No. 11/326,105 in 9 pages.

Final Office Action dated Jul. 31, 2008 issued in U.S. Appl. No. 11/326,105 in 17 pages.

Amendment after Final filed Sep. 30, 2008 in U.S. Appl. No. 11/326,105 in 9 pages.

Office Action dated Oct. 17, 2008 issued in U.S. Appl. No. 11/326,105 in 20 pages.

Amendment filed Jan. 16, 2009 in U.S. Appl. No. 11/326,105 in 9 pages.

Final Office Action dated Apr. 7, 2009 issued in U.S. Appl. No. 11/326,105 in 25 pages.

Notice of Appeal and Pre Appeal Request for Conference filed Sep. 3, 2009 in U.S. Appl. No. 11/326,105 on in 7 pages.

Office Action dated Jun. 26, 2009 issued in U.S. Appl. No. 11/326,106 in 12 pages.

Amendment filed Sep. 25, 2009 in U.S. Appl. No. 11/326,106 in 8 pages.

Office Action dated Dec. 31, 2007 issued in U.S. Appl. No. 11/326,585 in 11 pages.

Amendment filed Mar. 31, 2008 in U.S. Appl. No. 11/326,585 in 10 pages.

Final Office Action dated Jul. 9, 2008 issued in U.S. Appl. No. 11/326,585 in 17 pages.

Amendment after Final filed Sep. 9, 2008 in U.S. Appl. No. 11/326,585 in 10 pages.

Advisory Action issued Sep. 24, 2008 in U.S. Appl. No. 11/326,585 in 3 pages.

Rce filed Oct. 9, 2008 in U.S. Appl. No. 11/326,585 in 3 pages.

Response to Advisory Action filed Oct. 9, 2008 in U.S. Appl. No. 11/326,585 in 9 pages.

Office Action dated Dec. 31, 2008 issued in U.S. Appl. No. 11/326,585 in 19 pages.

Amendment filed Mar. 30, 2009 in U.S. Appl. No. 11/326,585 in 10 pages.

Final Office Action dated Jul. 6, 2009 issued in U.S. Appl. No. 11/326,585 in 25 pages.

Notice of Appeal and Pre-Appeal Brief Request for Review filed Sep. 30, 2009 in U.S. Appl. No. 11/326,585 in 7 pages.

English Translation of Communication from the Japanese Patent Office dated Jan. 26, 2010 for Japanese Patent Application 2005-000247.

Final Office Action dated Jan. 25, 2010 issued in U.S. Appl. No. 11/326,106 in 13 pages.

Office Action dated Mar. 29, 2010 issued in U.S. Appl. No. 11/326,585 in 21 pages.

* cited by examiner

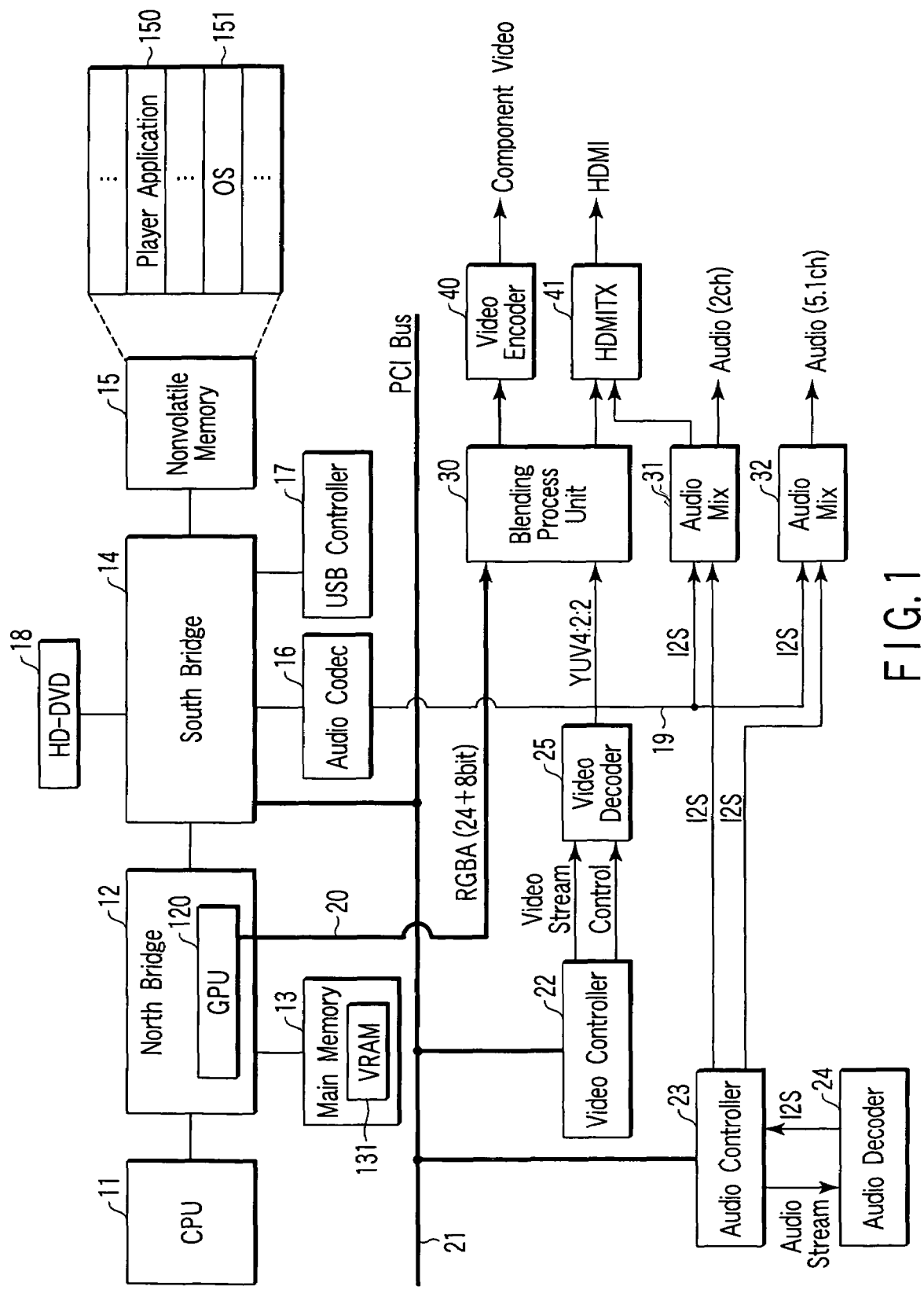
F I G. 1

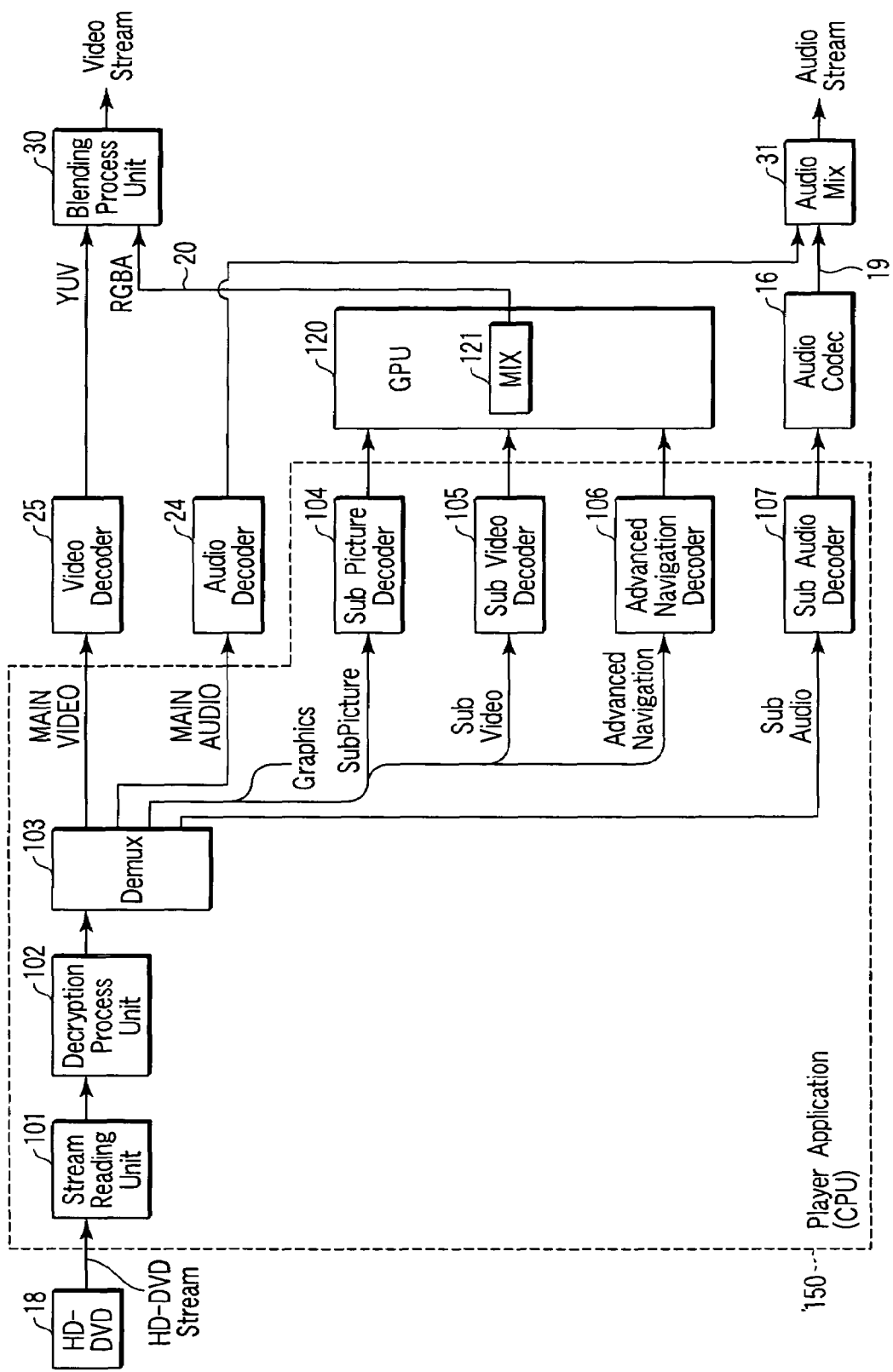
F I G. 3

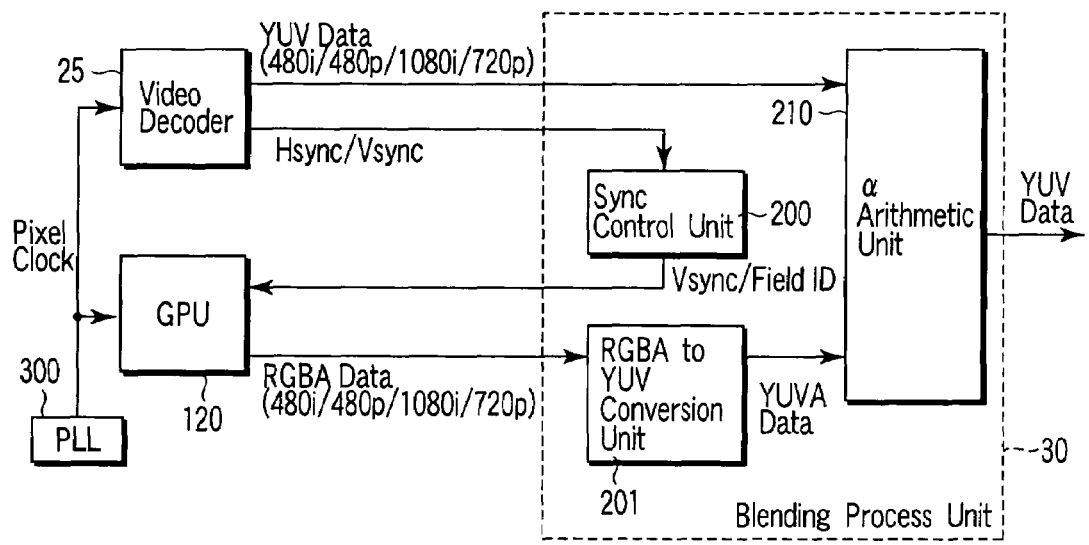
F I G. 12
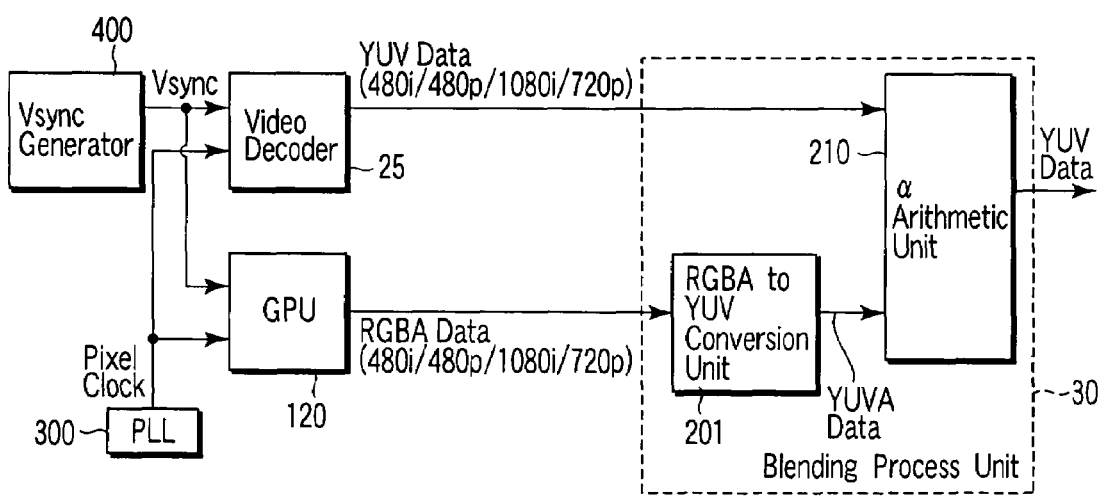
F I G. 13

RGB→YUV Conversion · α Arithmetic Operation

- For 480i/480p YCbCr Conversion
$$\begin{cases} Y = 0.257*R+0.504*G+0.098*B+16 \\ U = -0.148*R-0.291*G+0.439*B+128 \\ V = 0.439*R-0.368*G-0.071*B+128 \end{cases}$$

- For 1080i/720p YCbCr Conversion
$$\begin{cases} Y = 0.183*R+0.614*G+0.062*B+16 \\ U = -0.100*R-0.339*G+0.439*B+128 \\ V = 0.439*R-0.399*G-0.040*B+128 \end{cases}$$

- α Arithmetic Operation in YUV Space
$$\begin{cases} Y = A/255*Y1 + (1-A/255)*Y2 \\ U = A/255*U1 + (1-A/255)*U2 \\ V = A/255*V1 + (1-A/255)*V2 \end{cases}$$

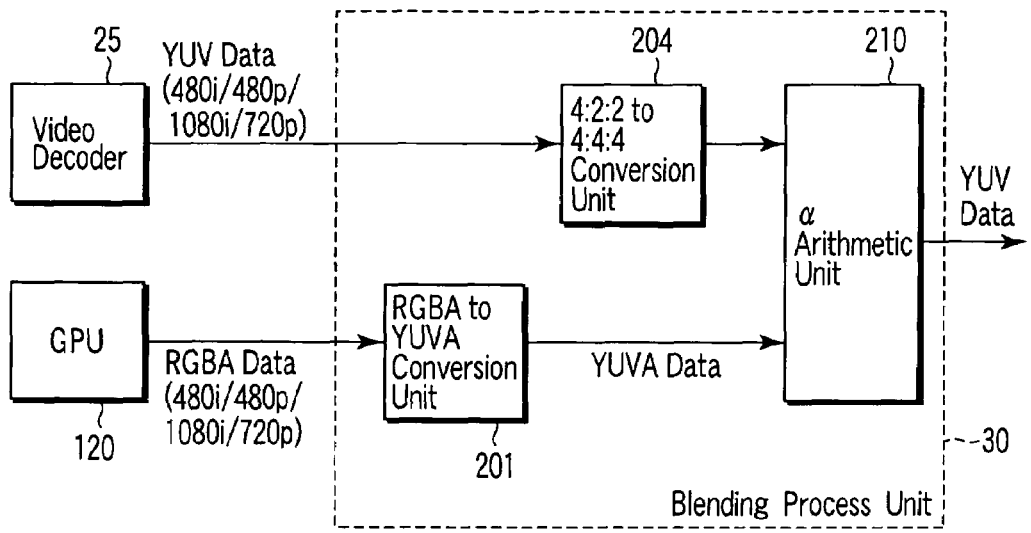
F I G. 16
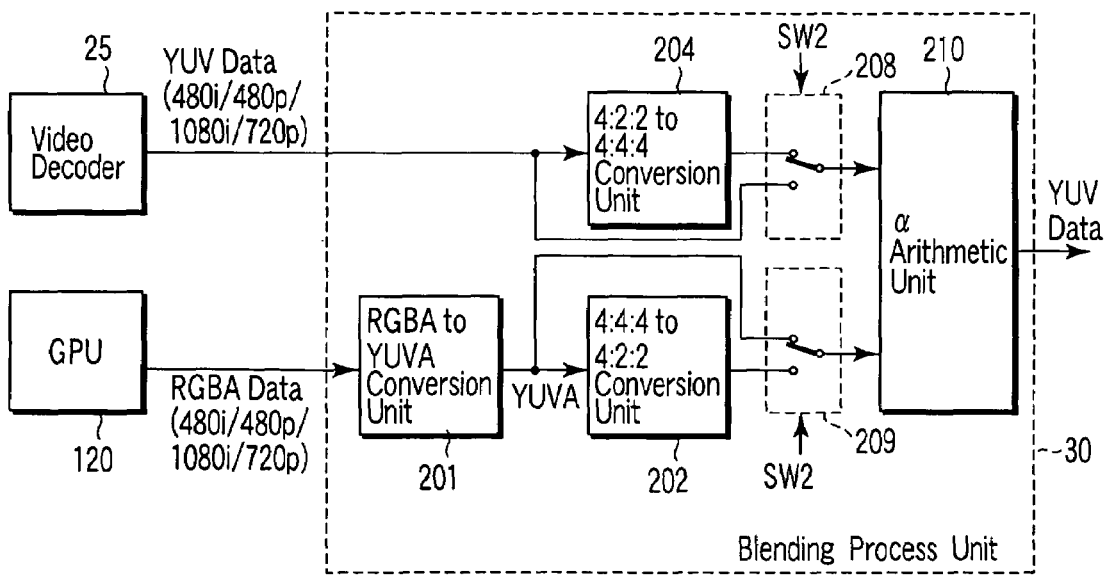
F I G. 17

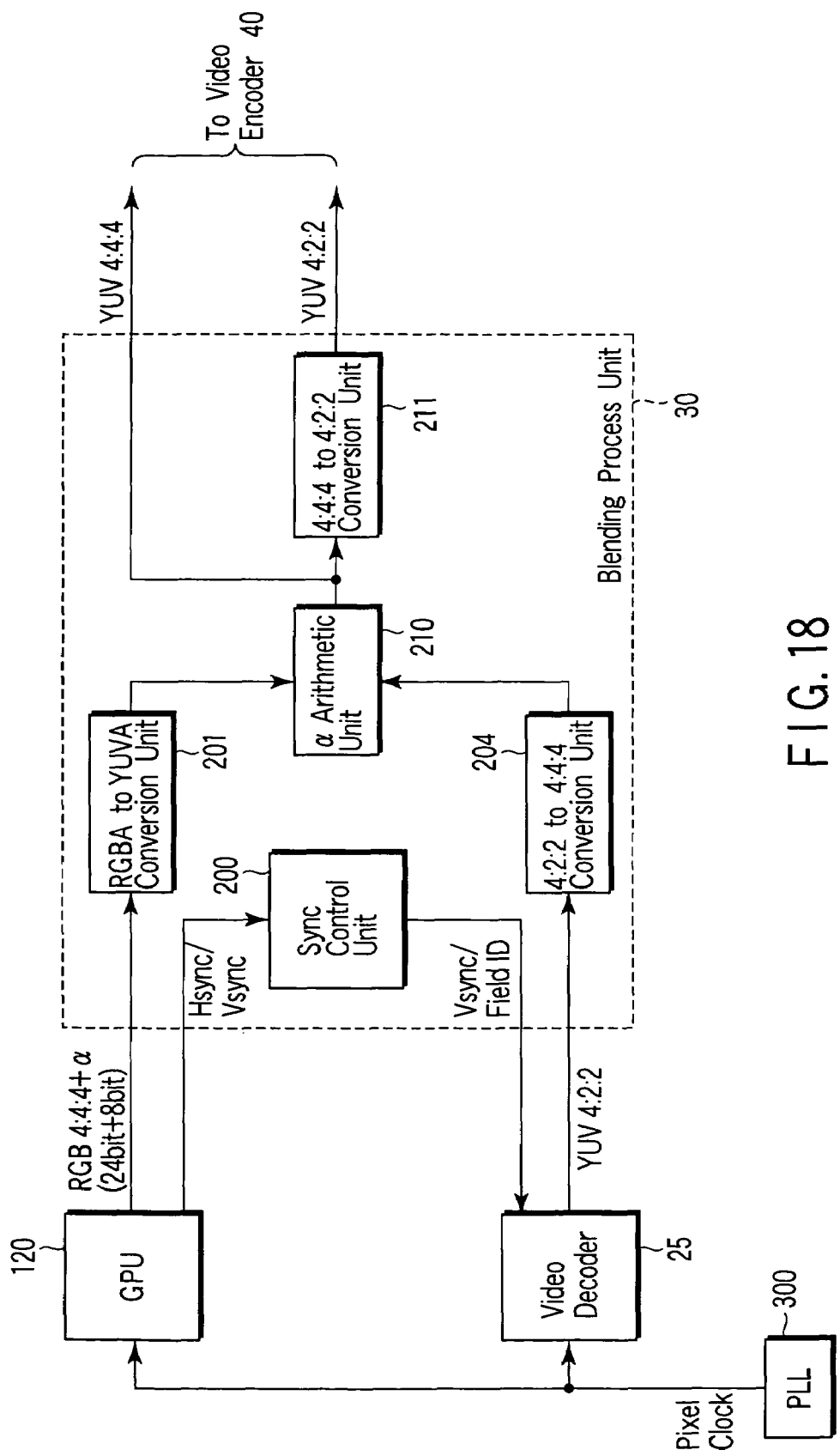
F I G. 18

REPRODUCING APPARATUS CAPABLE OF REPRODUCING PICTURE DATA

CROSS-REFERENCE TO RELATED APPLICATIONS

This application is based upon and claims the benefit of priority from prior Japanese Patent Application No. 2005-000250, filed Jan. 4, 2005, the entire contents of which are incorporated herein by reference.

BACKGROUND OF THE INVENTION

1. Field of the Invention

The present invention relates to a reproducing apparatus such as a high definition digital versatile disc (HD-DVD) player.

2. Description of the Related Art

In recent years, with a progress in digital compression-encoding technology for motion video, reproducing apparatuses (players), which can handle high-definition video according to the high definition (HD) standard, have steadily been developed.

In this type of player, there is a demand for blending video data and graphics data at a high level, thereby to enhance interactivity. Alpha blending is known as a technique for blending picture data. The alpha blending is a blending technique wherein alpha data, which represents the degree of transparency of each pixel of a picture, is used to overlay this picture on another picture.

Japanese Patent Application KOKAI Publication No. 8-205092, for instance, discloses a system in which graphics data and video data are mixed by a display controller. In that system, the display controller captures video data and overlays the captured video data on a partial area of a graphics screen.

The system of Japanese Patent Application KOKAI Publication No. 8-205092, however, presupposes that video data with a relatively low resolution is handled. In that system, no consideration is given to the handling of high-definition pictures such as HD-standard video data. The amount of HD-standard video data, which is to be processed per unit time, is enormous, and it is practically difficult for the display controller to capture HD-standard video data.

It is thus desirable to realize a system architecture wherein video data, which is output from, e.g., a video decoder, and graphics data, which is output from a display controller, are blended not within the display controller, but by an external blending circuit.

In normal cases, the alpha blending process is executed on an RGB color space. Thus, when video data of a YUV color space and graphics data of an RGB color space are to be blended, the video data is once color-converted to RGB data, and then blended with the graphics data. In this case, a color distortion occurs due to a rounding error at a time of a color conversion arithmetic operation. Consequently, the image quality of HD-standard video data deteriorates due to the blending process.

Under the circumstances, there is a demand for a reproducing apparatus that can blend video data and graphics data without degrading the image quality of video data.

BRIEF SUMMARY OF THE INVENTION

According to one aspect of the present invention, there is provided a reproducing apparatus comprising a graphics processing unit that outputs graphics data of an RGB color space; a video decoder that outputs video data of a YUV color space; a conversion unit that converts a color space of the graphics data from the RGB color space to the YUV color space; a blending process unit that executes a blending process in which the graphics data that is converted to the YUV color space and the video data of the YUV color space are blended on the YUV color space; and a picture data output unit that outputs picture data, which is obtained by the blending process, to a display apparatus.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram that shows the structure of a reproducing apparatus according to an embodiment of the present invention;

FIG. 3 is a view for explaining the functional structure of a software decoder that is realized by the player application shown in FIG. 2;

FIG. 12 is a block diagram that shows a second example of the structure of the blending process unit that is provided in the reproducing apparatus shown in FIG. 1;

FIG. 13 is a block diagram that shows a third example of the structure of the blending process unit that is provided in the reproducing apparatus shown in FIG. 1;

FIG. 16 is a block diagram that shows a fifth example of the structure of the blending process unit that is provided in the reproducing apparatus shown in FIG. 1;

FIG. 17 is a block diagram that shows a sixth example of the structure of the blending process unit that is provided in the reproducing apparatus shown in FIG. 1; and FIG. 18 is a block diagram that shows a seventh example of the structure of the blending process unit that is provided in the reproducing apparatus shown in FIG. 1.

DETAILED DESCRIPTION OF THE INVENTION

Figure 2:
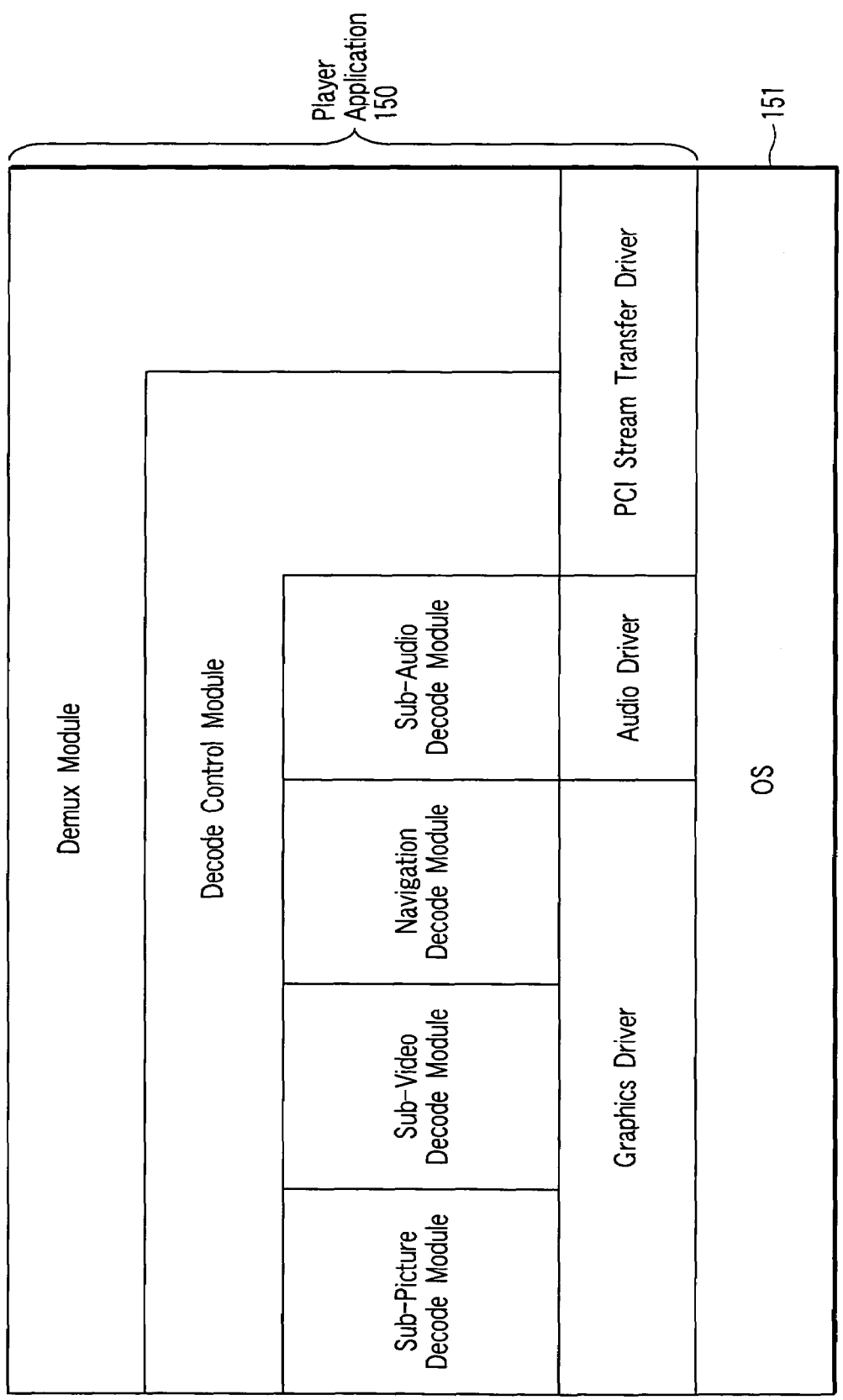
FIG. 2 shows the structure of a player application that is used in the reproducing apparatus shown in FIG. 1.

Embodiments of the present invention will be described below with reference to the drawings.

FIG. 1 shows an example of the structure of a reproducing apparatus according to an embodiment of the present invention. The reproducing apparatus is a media player that reproduces audio/video (AV) content. The reproducing apparatus is realized as an HD-DVD player that reproduces audio/video (AV) content, which is stored on DVD media according to HD-DVD (High Definition Digital Versatile Disc) standard.

As is shown in FIG. 1, the HD-DVD player includes a central processing unit (CPU) 11, a north bridge 12, a main memory 13, a south bridge 14, a nonvolatile memory 15, an audio codec 16, a universal serial bus (USB) controller 17, an HD-DVD drive 18, an audio bus 19, a graphics bus 20, a peripheral component interconnect (PCI) bus 21, a video controller 22, an audio controller 23, an audio decoder 24, a video decoder 25, a blending process unit 30, audio mixers 31, 32, a video encoder 40, and an AV interface (HDMI-TX) 41 such as a high definition multimedia interface (HDMI).

In this HD-DVD player, a player application 150 and an operating system (OS) 151 are preinstalled in the nonvolatile memory 15. The player application 150 is software that runs on the OS 151, and executes a control to reproduce AV content that is read out of the HD-DVD drive 18.

AV content, which is stored on HD-DVD media, which is driven by the HD-DVD drive 18, contains a motion video stream (HD-DVD stream) such as a stream that is compression-encoded by H.264 or MPEG2 format. In the HD-DVD stream, compression-encoded main video data (motion video), compression-encoded main audio data, compression-encoded graphics data including alpha data, and compression-encoded sub-audio data are multiplexed.

The compression-encoded main video data is data that is obtained by encoding motion video data, which is used as main video (main screen picture), according to the H.264/AVC encoding scheme. The main video data contains an HD standard high-definition picture. Alternatively, main video data according to standard definition (SD) scheme can be used. The compression-encoded graphics data is sub-video (sub-screen picture) that is displayed in a state in which the sub-video is overlaid on main video. The graphics data contains sub-video data, which is formed of motion video that supplements the main video, sub-picture data including text (e.g., caption)/still picture, and navigation data (Advanced Navigation) for displaying operation guidance such as a menu object. The navigation data contains still picture/motion video (including animation)/text. The navigation data includes a script in which the motion of an object picture such as a menu object is described. The script is interpreted and executed by the CPU 11. Thereby, a menu object with high interactivity can be displayed on main video.

These sub-video data, sub-picture data and navigation data are compression-encoded.

The HD-standard main video has a resolution of, e.g., 1920×1080 pixels or 1280×720 pixels. Each of the sub-video data, sub-picture data and navigation data has a resolution of, e.g., 720×480 pixels.

In this HD-DVD player, software (player application 150) executes a separation process for separating main video data, main audio data, graphics data and sub-audio data from a HD-DVD stream that is read out from the HD-DVD drive 18, and a decoding process for decoding the graphics data and sub-audio data. On the other hand, dedicated hardware executes a decoding process for decoding main video data and main audio data, which typically use a greater amount of processing.

The CPU 11 is a processor that is provided in order to control the operation of the HD-DVD player. The CPU 11 executes the OS 151 and player application 150, which are loaded from the nonvolatile memory 15 into the main memory 13. In one embodiment, a part of the memory area within the main memory 13 is used as a video memory (VRAM) 131. It is not necessary, however, to use a part of the memory area within the main memory 13 as the VRAM 131. The VRAM 131 can be provided as a memory device that is independent from the main memory 13.

The north bridge 12 is a bridge device that connects a local bus of the CPU 11 and the south bridge 14. The north bridge 12 includes a memory controller that access-controls the main memory 13. The north bridge 12 also includes a graphics processing unit (GPU) 120.

The GPU 120 is a graphics controller that generates graphics data (also referred to as graphics picture data), which forms a graphics screen picture, from data that is written by the CPU 11 in the video memory (VRAM) 131 that is assigned to the partial memory area of the main memory 13. The GPU 120 generates graphics data using a graphics arithmetic function such as bit block transfer. For example, in a case where picture data (sub-video, sub-picture, navigation) are written in three planes in the VRAM 131 by the CPU 11, the GPU 120 executes a blending process, with use of bit block transfer, which blends the picture data corresponding to the three planes on a pixel-by-pixel basis, thereby generating graphics data for forming a graphics screen picture with the same resolution (e.g., 1920×1080 pixels) as the main video. The blending process is executed using alpha data that are associated with the picture data of sub-video, sub-picture and navigation, respectively. The alpha data is a coefficient representative of the degree of transparency (or non-transparency) of each pixel of the associated picture data. The alpha data corresponding to the sub-video, sub-picture and navigation are multiplexed on the stream along with the picture data of the sub-video, sub-picture and navigation. Specifically, each of the sub-video, sub-picture and navigation included in the stream contains picture data and alpha data.

The graphics data that is generated by the GPU 120 has an RGB color space. Each pixel of the graphics data is expressed by digital RGB data (24 bits).

The GPU 120 includes not only the function of generating graphics data that forms a graphics screen picture, but also a function of outputting alpha data, which corresponds to the generated graphics data, to the outside.

Specifically, the GPU 120 outputs the generated graphics data to the outside as an RGB video signal, and outputs the alpha data, which corresponds to the generated graphics data, to the outside. The alpha data is a coefficient (8 bits) representative of the transparency (or non-transparency) of each pixel of the generated graphics data (RGB). The GPU 120 outputs, on a pixel-by-pixel basis, alpha-data-added graphics data (32-bit RGBA data), which contains graphics data (24-bit digital RGB video signal) and alpha data (8-bit). The alpha-data-added graphics data (32-bit RGBA data) is sent to the blending process unit 30 in sync with each pixel over the dedicated graphics bus 20. The graphics bus 20 is a transmission line that is connected between the GPU 120 and the blending process unit 30.

In this HD-DVD player, the alpha-data-added graphics data is directly sent from the GPU 120 to the blending process unit 30 via the graphics bus 20. Thus, there is no need to transfer the alpha data from the VRAM 131 to the blending process unit 30 via, e.g., the PCI bus 21, and it is possible to avoid an increase in traffic of the PCI bus 21 due to the transfer of alpha data.

If the alpha data were to be transferred from the VRAM 131 to the blending process unit 30 via, e.g., the PCI bus 21, it would typically be necessary to synchronize the graphic data output from the GPU 120 and the alpha data transferred via the PCI bus 21 within the blending process unit 30. This leads to complexity in structure of the blending process unit 30. In this HD-DVD player, the GPU 120 outputs the graphics data and alpha data by synchronizing them on a pixel-by-pixel basis. Therefore, synchronization between the graphics data and alpha data can easily be realized.

The south bridge 14 controls the devices on the PCI bus 21. The south bridge 14 includes an IDE (Integrated Drive Electronics) controller for controlling the HD-DVD drive 18. The south bridge 14 has a function of accessing the nonvolatile memory 15, USB controller 17 and audio codec 16.

The HD-DVD drive 18 is a drive unit for driving storage media such as HD-DVD media that stores audio/video (AV) content according to the HD-DVD standard.

The audio codec 16 converts software-decoded sub-audio data to an I2S (Inter-IC Sound) format digital audio signal. The audio codec 16 is connected to the audio mixers (Audio Mix) 31 and 32 via the audio bus 19. The audio bus 19 is a transmission line that is connected between the audio codec 16 and the audio mixers (Audio Mix) 31 and 32. The audio bus 19 transfers the digital audio signal from the audio codec 16 to the audio mixers (Audio Mix) 31 and 32, not through the PCI bus 21.

The video controller 22 is connected to the PCI bus 21. The video controller 22 is an LSI for executing interface with the video decoder 25. A stream (Video Stream) of main video data, which is separated from the HD-DVD stream by software, is sent to the video decoder 25 via the PCI bus 21 and video controller 22. In addition, decode control information (Control) that is output from the CPU 11 is sent to the video decoder 25 via the PCI bus 21 and video controller 22.

In one embodiment, the video decoder 25 is a decoder that supports the H.264/AVC standard. The video decoder 25 decodes HD-standard main video data and generates a digital YUV video signal that forms a video screen picture with a resolution of, e.g., 1920×1080 pixels. The digital YUV video signal is sent to the blending process unit 30.

The audio controller 23 is connected to the PCI bus 21. The audio controller 23 is an LSI for executing interface with the audio decoder 24. A stream (Audio Stream) of main video data, which is separated from the HD-DVD stream by software, is sent to the audio decoder 24 via the PCI bus 21 and audio controller 23.

The audio decoder 24 decodes the main audio data and generates an I2S (Inter-IC Sound) format digital audio signal. This digital audio signal is sent to the audio mixers (Audio Mix) 31 and 32 via the audio controller 23.

The blending process unit 30 is connected to the GPU 120 and video decoder 25, and executes a blending process for blending graphics data, which is output from the GPU 120, and main video data, which is decoded by the video decoder 25. Specifically, this blending process is a blending process (alpha blending process) for blending, on a pixel-by-pixel basis, the digital RGB video signal, which forms the graphics data, and the digital YUV video signal, which forms the main video data, on the basis of the alpha data that is output along with the graphics data (RGB) from the GPU 120. In this case, the main video data is used as a lower-side screen picture, and the graphics data is used as an upper-side screen picture that is overlaid on the main video data.

The output picture data that is obtained by the blending process is delivered, for example, as a digital YUV video signal, to the video encoder 40 and AV interface (HDMI-TX) 41. The video encoder 40 converts the output picture data (digital YUV video signal), which is obtained by the blending process, to a component video signal or an S-video signal, and outputs it to an external display device (monitor) such as a TV receiver. The AV interface (HDMI-TX) 41 outputs digital signals including the digital YUV video signal and digital audio signal to an external HDMI device.

The audio mixer (Audio Mix) 31 mixes the sub-audio data, which is decoded by the audio codec 16, and the main audio data, which is decoded by the audio decoder 24, and outputs the mixed result as a stereo audio signal. The audio mixer (Audio Mix) 32 mixes the sub-audio data, which is decoded by the audio codec 16, and the main audio data, which is decoded by the audio decoder 24, and outputs the mixed result as a 5.1 channel audio signal.

Next, referring to FIG. 2, the structure of the player application 150, which is executed by the CPU 11, is described.

The player application 150 includes a demultiplex (Demux) module, a decode control module, a sub-picture (Sub-Picture) decode module, a sub-video (Sub-Video) decode module, a navigation (Navigation) decode module, a sub-audio (Sub-Audio) decode module, a graphics driver, an audio driver, and a PCI stream transfer driver.

The Demux module is software that executes a demultiplex process for separating, from the stream read out of the HD-DVD drive 18, main video data, main audio data, graphics data (sub-picture data, sub-video data and navigation data), and sub-audio data. The decode control module is software that controls decoding processes for the main video data, main audio data, graphics data (sub-picture data, sub-video data and navigation data), and sub-audio data. The control of the decoding processes is executed on the basis of, e.g., reproduction control information, which is multiplexed on the HD-DVD stream. The reproduction control information is information for controlling a reproduction procedure for the main video data and graphics data (sub-picture data, sub-video data and navigation data).

The sub-picture (Sub-Picture) decode module decodes the sub-picture data. The sub-video (Sub-Video) decode module decodes the sub-video data. The navigation (Navigation) decode module decodes the navigation data. The sub-audio (Sub-Audio) module decodes the sub-audio data.

The graphics driver is software for controlling the GPU 120. The decoded sub-picture data, decoded sub-video data and decoded navigation are sent to the GPU 120 via the graphics driver. The graphics driver issues various rendering instructions to the GPU 120.

The audio driver is software for controlling the audio codec 16. The decoded sub-audio data is sent to the audio codec 16 via the audio driver.

The PCI stream transfer driver is software for transferring the stream via the PCI bus 21. The main video data and main audio data are transferred by the PCI stream transfer driver to the video decoder 25 and audio decoder 24 via the PCI bus 21.

Next, referring to FIG. 3, a description is given of the functional structure of the software decoder that is realized by the player application 150, which is executed by the CPU 11.

The software decoder, as shown in FIG. 3, includes a stream reading unit 101, a decryption process unit 102, a demultiplex (Demux) unit 103, a sub-picture decoder 104, a sub-video decoder 105, an advanced navigation decoder 106, and a sub-audio decoder 107.

The stream (HD-DVD stream) that is stored on the HD-DVD media in the HD-DVD drive 18 is read out of the HD-DVD drive 18 by the stream reading unit 101. The HD-DVD stream is encrypted by, e.g., content scrambling system (CSS). The HD-DVD stream that is read out of the HD-DVD media by the stream reading unit 101 is input to the decryption process unit 102. The decryption process unit 102 executes a process for decrypting the HD-DVD stream. The decrypted HD-DVD stream is input to the demultiplex (Demux) unit 103. The Demux 103 is realized by the Demux module in the player application 150. The Demux 103 separates, from the HD-DVD stream, main video data (MAIN VIDEO), main audio data (MAIN AUDIO), graphics data (Sub-Picture, Sub-Video and Advanced Navigation) and sub-audio data (Sub-Audio).

The main video data (MAIN VIDEO) is sent to the video decoder 25 via the PCI bus 21. The main video data (MAIN VIDEO) is decoded by the video decoder 25. The decoded main video data has a resolution of 1920×1080 pixels according to the HD standard, and is sent to the blending process unit 30 as a digital YUV video signal. The main audio data (MAIN AUDIO) is sent to the audio decoder 24 via the PCI bus 21. The main audio data (MAIN AUDIO) is decoded by the audio decoder 24. The decoded main audio data (MAIN AUDIO) is sent to the audio mixer 31 as an I2S-format digital audio signal.

The sub-picture data, sub-video data and advanced navigation data are sent to the sub-picture decoder 104, sub-video decoder 105 and advanced navigation decoder 106. The sub-picture decoder 104, sub-video decoder 105 and advanced navigation decoder 106 are realized by the sub-picture (Sub-Picture) decode module, sub-video (Sub-Video) decode module and navigation (Navigation) decode module of the player application 150. The sub-picture data, sub-video data and advanced navigation data, which have been decoded by the sub-picture decoder 104, sub-video decoder 105 and advanced navigation decoder 106, are written in the VRAM 131. The sub-picture data, sub-video data and advanced navigation data, which have been written in the VRAM 131, include RGB data and alpha data (A) in association with each pixel.

The sub-audio data is sent to the sub-audio decoder 107. The sub-audio decoder 107 is realized by the sub-audio (Sub-audio) decode module of the player application 150. The sub-audio data is decoded by the sub-audio decoder 107. The decoded sub-audio data is converted to an I2S-format digital audio signal by the audio codec 16, and is sent to the audio mixer 31.

The GPU 120 generates graphics data for forming a graphics screen picture of 1920×1080 pixels, on the basis of the decoded results of the sub-picture decoder 104, sub-video decoder 105 and advanced navigation decoder 106, that is, picture data corresponding to the sub-picture data, sub-video data and advanced navigation data, which are written in the VRAM 131 by the CPU 11. In this case, the three picture data corresponding to the sub-picture data, sub-video data and advanced navigation data are blended by an alpha blending process that is executed by a mixer (MIX) unit 121 of the GPU 120.

In this alpha blending process, alpha data corresponding to the three picture data written in the VRAM 131 are used. Specifically, each of the three picture data written in the VRAM 131 contains RGB data and alpha data. The mixer (MIX) unit 121 executes the blending process on the basis of the alpha data of the three picture data and position information of each of the three picture data, which is told from the CPU 11. Thereby, the mixer (MIX) unit 121 generates a graphics screen picture, which includes, for instance, the three picture data that are at least partly blended. As regards an area where the picture data are blended, new alpha data corresponding to the area is calculated by the mixer (MIX) unit 121. The colors of the pixels in that area in the graphics screen picture of 1920×1080 pixels, which includes no effective picture data, are black. The alpha value corresponding to the pixels in the area, which includes no effective picture data, is a value (alpha=0) that indicates that these pixels are transparent.

In this way, the GPU 120 generates the graphics data (RGB) that form the graphics screen picture of 1920×1080 pixels, and the alpha data corresponding to the graphics data, on the basis of the decoded results of the sub-picture decoder 104, sub-video decoder 105 and advanced navigation decoder 106. As regards a scene in which only one of the pictures of the sub-picture data, sub-video data and advanced navigation data, or the GPU 120 generates graphics data that corresponds to a graphics screen picture, in which the picture (e.g., 720×480) is disposed on the surface of 1920×1080 pixels, and alpha data corresponding to the graphics data.

The graphics data (RGB) and alpha data, which are generated by the GPU 120, are sent as RGBA data to the blending process unit 30 via the graphics bus 20.

Figure 4:
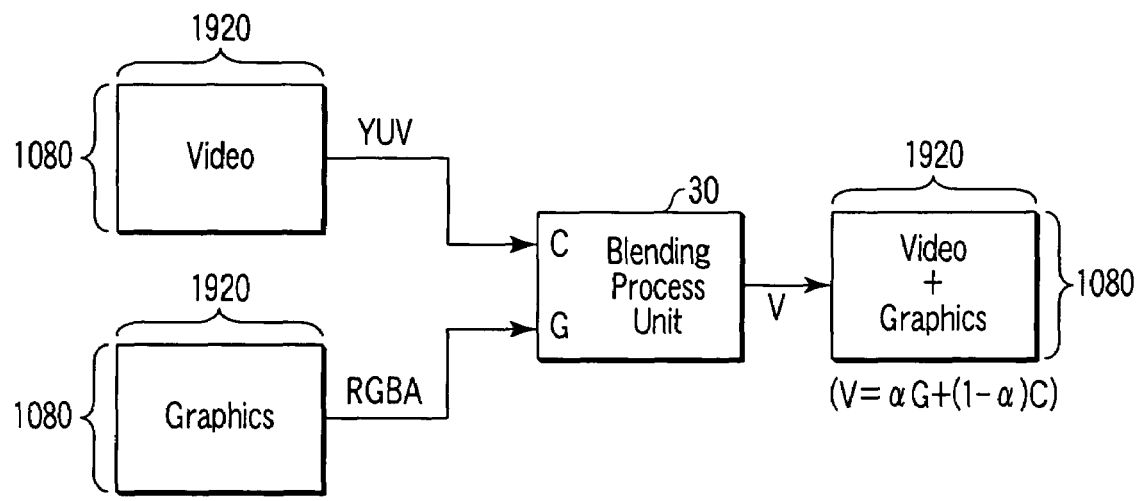
FIG. 4 is a view for explaining a blending process that is executed by a blending process unit, which is provided in the reproducing apparatus shown in FIG. 1.

Next, referring to FIG. 4, the blending process (alpha blending process) that is executed by the blending process unit 30 is explained.

The alpha blending process is a blending process in which graphics data and main video data are blended on a pixel-by-pixel basis, on the basis of alpha data (A) that accompanies the graphics data (RGB). In this case, the graphics data (RGB) is used as an oversurface and is laid on the video data. The resolution of the graphics data that is output from the GPU 120 is equal to that of the main video data that is output from the video decoder 25.

Assume now that main video data (Video) with a resolution of 1920×1080 pixels was input to the blending process unit 30 as picture data C, and graphics data with a resolution of 1920×1080 pixels was input to the blending process unit 30 as picture data G. In this case, on the basis of alpha data (A) with a resolution of 1920×1080 pixels, the blending process unit 30 executes an arithmetic operation for overlaying the picture data G on the picture data C in units of a pixel. This arithmetic operation is executed by the following equation (1):

$$V = \alpha \times G + (1-\alpha)C \quad (1)$$

where V is the color of each pixel of output picture data obtained by the alpha blending process, and α is the alpha value corresponding to each pixel of graphics data G.

Figure 5:
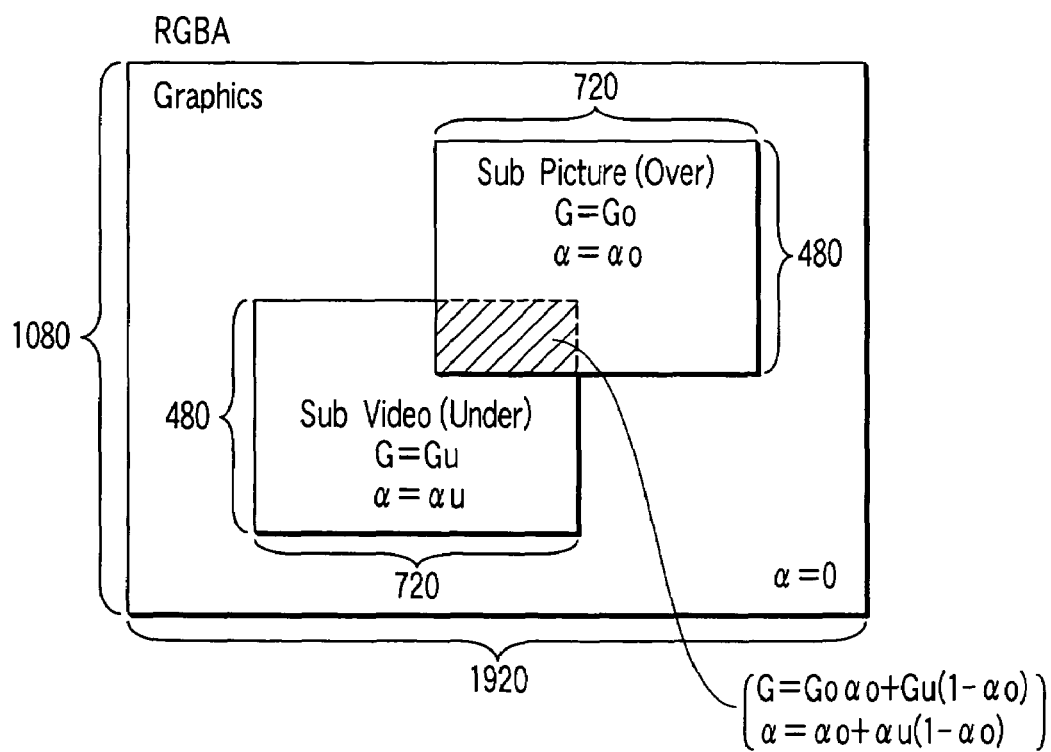
FIG. 5 is a view for explaining a blending process that is executed by a GPC, which is provided in the reproducing apparatus shown in FIG. 1.

Next, referring to FIG. 5, the blending process (alpha blending process), which is executed by the MIX unit 121 of the GPU 120, is explained.

Assume now that graphics data with a resolution of 1920×1080 pixels is generated from the sub-picture data and sub-video data that are written in the VRAM 131. Each of the sub-picture data and sub-video data has a resolution of, e.g., 720×480 pixels. In this case, each of the sub-picture data and sub-video data is accompanied with alpha data with a resolution of, e.g., 720×480 pixels.

For example, a picture corresponding to the sub-picture data is used as an oversurface, and a picture corresponding to the sub-video data is used as an undersurface.

The color of each pixel in an area where the picture corresponding to the sub-picture data and the picture corresponding to the sub-video data overlap is given by the following equation (2):

$$G = Go \times \alpha o + Gu(1 - \alpha o) \qquad (2)$$

where G is the color of each pixel in the overlapping area, Go is the color of each pixel of the sub-picture data that is used as an oversurface, αo is the alpha value of each pixel of the sub-picture data that is used as an oversurface, and Gu is the color of each pixel of the sub-video that is used as an undersurface.

The alpha value of each pixel in an area where the picture corresponding to the sub-picture data and the picture corresponding to the sub-video data overlap is given by the following equation (3):

$$\alpha = \alpha o + \alpha u \times (1 - \alpha o) \qquad (3)$$

where α is the alpha value of each pixel in the overlapping area, and αu is the alpha value of each pixel of the sub-video data that is used as an undersurface.

In this way, the MIX unit 121 of the GPU 120 blends the sub-picture data and sub-video data by using that one of the alpha data corresponding to the sub-picture data and the alpha data corresponding to the sub-video data, which is to be used as the oversurface. Thereby, the MIX unit 121 generates graphics data for forming a screen picture of 1920×1080 pixels. Further, the MIX unit 121 of the GPU 120 calculates the alpha value of each pixel of the graphics data for forming a screen picture of 1920×1080 pixels, on the basis of the alpha data corresponding to the sub-picture data and the alpha data corresponding to the sub-video data.

Specifically, the MIX unit 121 of the GPU 120 executes the blending process for blending a surface of 1920×1080 pixels (the color of pixels=black, the alpha value of pixels=0), a surface of sub-video data of 720×480 pixels, and a surface of sub-picture data of 720×480 pixels. Thereby, the MIX unit 121 calculates graphics data for forming a screen picture of 1920×1080 pixels, and alpha data of 1920×1080 pixels. The surface of 1920×1080 pixels is used as a lowest surface, the surface of the sub-video data is used as a second lowest surface, and the surface of the sub-picture data is used as an uppermost surface.

In the screen picture of 1920×1080 pixels, the color of each pixel in the area, where neither sub-picture data nor sub-video data is present, is black. The color of each pixel in the area, where only sub-picture data is present, is the same as the normal color of each associated pixel of the sub-picture data. Similarly, the color of each pixel in the area, where only sub-video data is present, is the same as the normal color of each associated pixel of the sub-video data.

In the screen picture of 1920×1080 pixels, the alpha value corresponding to each pixel in the area, where neither sub-picture data nor sub-video data is present, is zero. The alpha value of each pixel in the area, where only sub-picture data is present, is the same as the normal alpha value of each associated pixel of the sub-picture data. Similarly, the alpha value of each pixel in the area, where only sub-video data is present, is the same as the normal alpha value of each associated pixel of the sub-video data.

Figure 6:
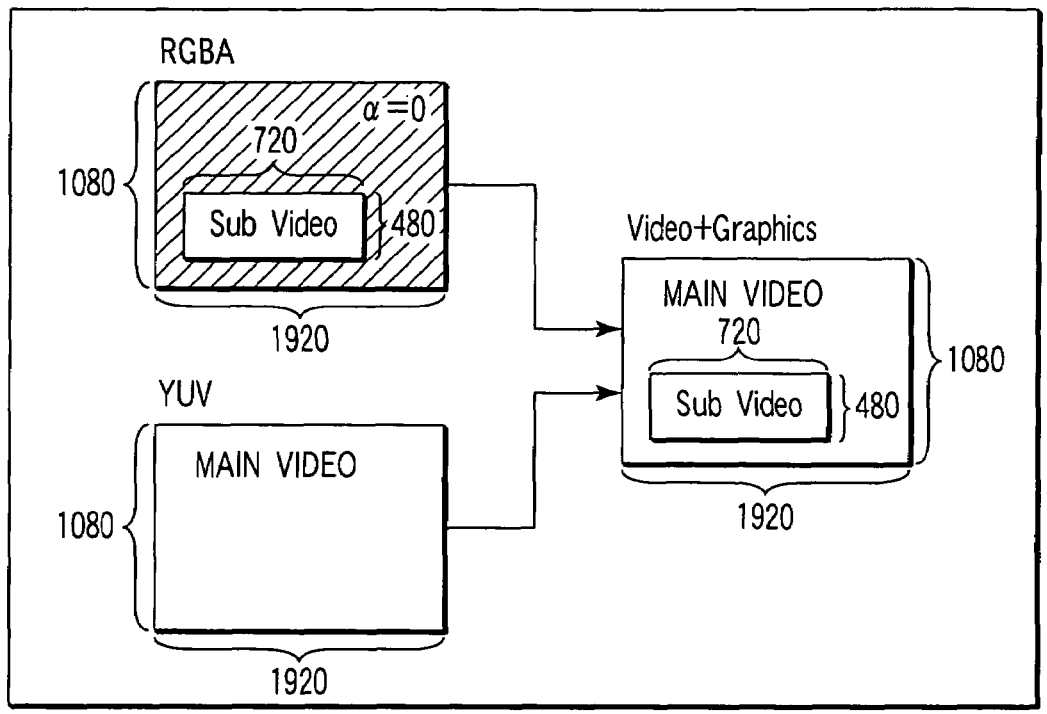
FIG. 6 shows a state in which sub-video data is overlaid on main video data in the reproducing apparatus shown in FIG. 1.

FIG. 6 shows a state in which sub-video data of 720×480 pixels is overlaid on main video data of 1920×1080 pixels.

In FIG. 6, graphics data is generated by a blending process that blends a surface of 1920×1080 pixels (the color of pixels=black, the alpha value of pixels=0) and a surface of sub-video data of 720×480 pixels on a pixel-by-pixel basis.

As has been described above, output picture data (Video+Graphics), which is output to the display device, is generated by blending the graphics data and main video data.

In the graphics data of 1920×1080 pixels, the alpha value of each pixel in the area, where the sub-video data of 720×480 pixels is absent, is zero. Accordingly, the area where the sub-video data of 720×480 pixels is absent is transparent. In this area, the main video data is displayed with the degree of non-transparency of 100%.

Each pixel of the sub-video data of 720×480 pixels is displayed on the main video data with a degree of transparency that is designated by the alpha data corresponding to the sub-video data. For example, a pixel of sub-video data with an alpha value=1 is displayed with 100% non-transparency, and a pixel of main video data corresponding to this pixel position is not displayed.

Figure 7:
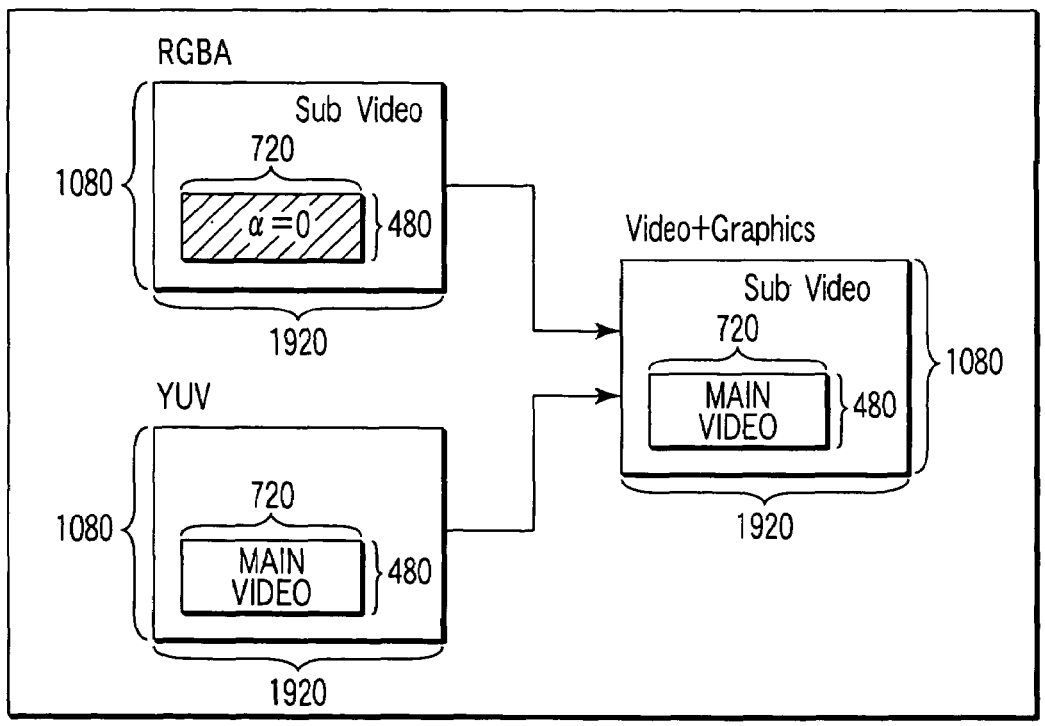
FIG. 7 shows a state in which main video data is displayed on a partial area of sub-video data in the reproducing apparatus shown in FIG. 1.

As is shown in FIG. 7, main video data, which is reduced to a resolution of 720×480 pixels, can be displayed on a partial area of sub-video data that is enlarged to a resolution of 1920×1080 pixels.

In one embodiment, the display mode illustrated in FIG. 7 is realized using a scaling function that is performed by the GPU 120 and a scaling function that is performed by the video decoder 25.

Specifically, in accordance with an instruction from the CPU 11, the GPU 120 executes such a scaling process as to gradually increase the resolution (picture size) of sub-video data up to 1920×1080 pixels. This scaling process is executed using pixel interpolation. As the resolution of the sub-video data becomes higher, the size of the area where the sub-video data of 720×480 pixels is not present (i.e. area with alpha value=0) gradually decreases within the graphics data of 1920×1080 pixels. Thereby, the size of the sub-video data, which is overlaid on the main video data and displayed, gradually increases, while the size of the area with the alpha value=0 gradually decreases. If the resolution (picture size) of the sub-video data reaches 1920×1080 pixels, the GPU 120 executes a blending process that overlays, on a pixel-by-pixel basis, a surface of, e.g., 720×480 pixels (the color of pixels=black, the alpha value of pixels=0) on the sub-video data of 1920×1080 pixels. Thus, the area of 720×480 pixels with the alpha value=0 is disposed on the sub-video data of 1920×1080 pixels.

On the other hand, in accordance with an instruction from the CPU 11, the video decoder 25 executes the scaling process that reduces the resolution of main video data to 720×480 pixels.

The main video data that is reduced to 720×480 pixels is displayed on an area of 720×480 pixels with the alpha value=0, which is disposed on the sub-video data of 1920×1080 pixels. Specifically, the alpha data that is output from the GPU 120 can also be used as a mask for limiting the area where the main video data is to be displayed.

As stated above, the alpha data that is output from the GPU 120 can freely be controlled by software. Thus, the graphics data can effectively be overlaid on the main video data and displayed. Thereby, video expression with high interactivity can easily be realized. Furthermore, since the alpha data is automatically transferred along with the graphics data to the blending process unit 30 from the GPU 120, the software does not need to recognize the transfer of alpha data to the blending process unit 30.

Figure 8:
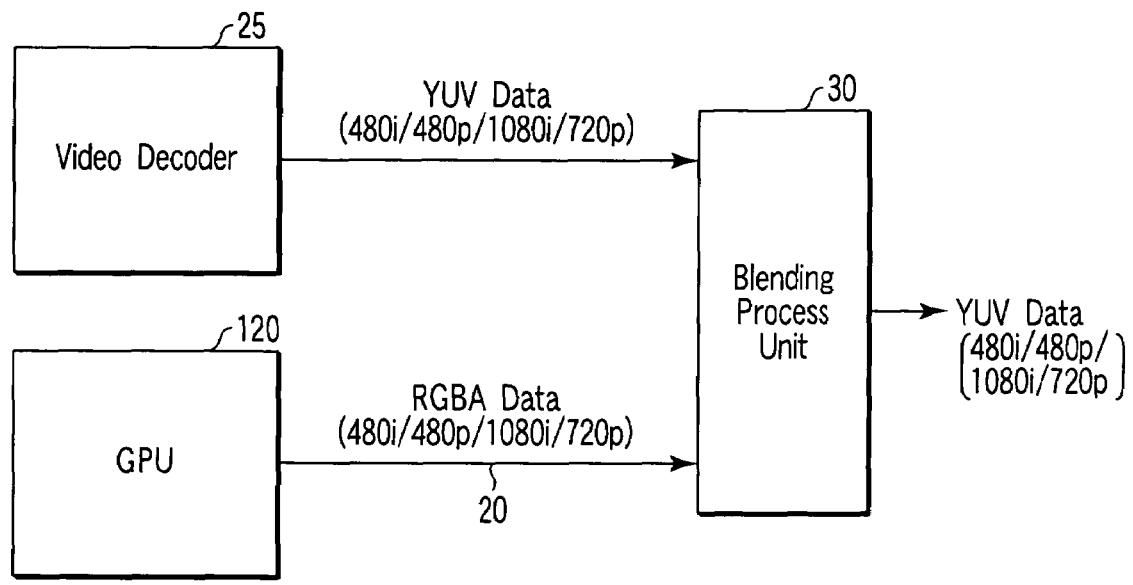
FIG. 8 illustrates an operation in which main video data and graphics data are transferred to the blending process unit in the reproducing apparatus shown in FIG. 1.

Next, referring to FIG. 8, a description is given of the operation for transferring the main video data and graphics data to the blending process unit 30.

The main video data is transferred as a digital YUV video signal from the video decoder 25 to the blending process unit 30. Depending on AV content that is included in an HD-DVD stream, there can be a case of using not HD (High Definition)-standard main video data but SD (Standard Definition)-standard main video data. Thus, the video decoder 25 is configured to support both SD and HD. The number of vertical lines of main video data, which is output from the video decoder 25, is any one of 480i, 480p, 1080i and 720p. In this case, 480i is the number of vertical lines of an SD-standard interlace picture, 480p is the number of vertical lines of an SD-standard progressive picture, 1080i is the number of vertical lines of an HD-standard interlace picture, and 720p is the number of vertical lines of an HD-standard progressive picture.

The GPU 120 outputs the alpha-data-added graphics data to the graphics bus 20 as an RGBA-format digital video signal. The resolution of a screen picture of the alpha-data-added graphics data is equal to that of a screen picture of main video data. That is, under the control of the CPU 11, the GPU 120 outputs the alpha-data-added graphics data, which corresponds to any one of 480i, 480p, 1080i and 720p.

Figure 9:
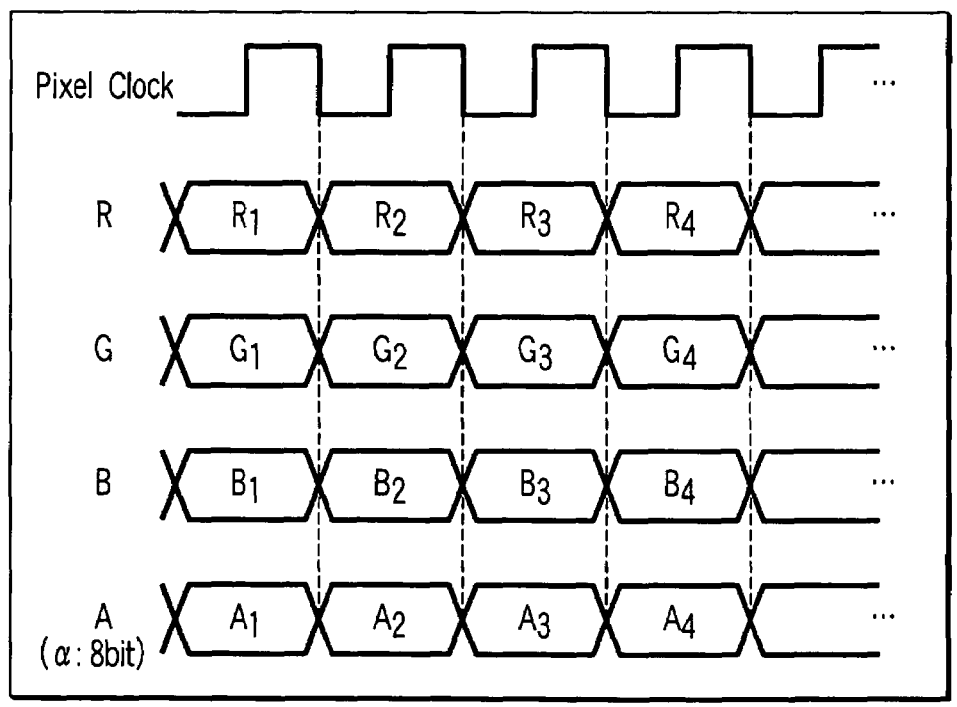
FIG. 9 illustrates a state in which graphics data and alpha data are transferred in synchronism in the reproducing apparatus shown in FIG. 1.

FIG. 9 illustrates a state in which alpha-data-added graphics data is transferred via the graphics bus 20.

The graphics bus 20 has a 32-bit width. As is shown in FIG. 9, graphics data (RGB=24 bits) and alpha data (A=8 bits) are transferred via the graphics bus 20 in sync with a pixel clock signal. The pixel clock signal is output from a pixel clock generator (PLL: Phase-Locked Loop), which is provided, for example, within the GPU 120. Symbols R1, G1, B1 and A1 represent four components of red, green, blue and transparency (alpha) of a first pixel. Similarly, R2, G2, B2 and A2 represent four components of red, green, blue and transparency (alpha) of a second pixel.

In this way, the graphics data (RGB) and alpha data (A) are sent to the blending process unit 30 in the state in which these data are synchronized on a pixel-by-pixel basis. Thus, blending of graphics data (RGB) and main video data (YUV) can easily be executed without providing the blending process unit 30 with a circuit for synchronizing the graphics data (RGB) and alpha data (A).

Figure 10:
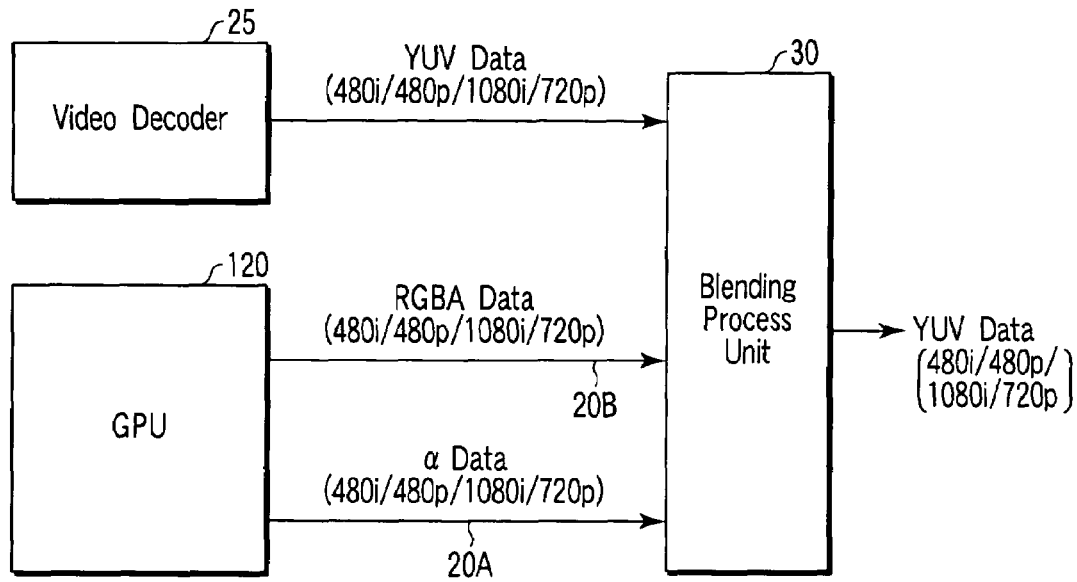
FIG. 10 illustrates a state in which graphics data and alpha data are transferred over different transmission lines in the reproducing apparatus shown in FIG. 1.

It is not necessary to transfer the alpha data (A) and graphics data (RGB) via the same bus. As is shown in FIG. 10, it is possible to transfer the alpha data (A) and graphics data (RGB) via different transmission lines. In FIG. 10, the alpha data (A) is transferred from the GPU 120 to the blending process unit 30 via a first graphics bus 20A, and the graphics data (RGB) is transferred from the GPU 120 to the blending process unit 30 via a second graphics bus 20B. The graphics buses 20A and 20B are provided between the GPU 120 and blending process unit 30.

Figure 11:
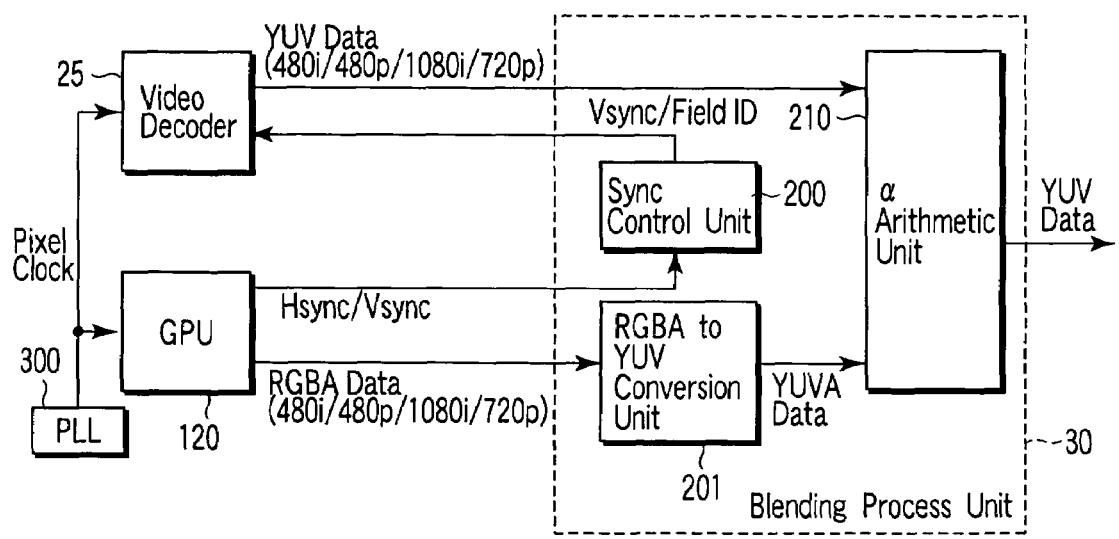
FIG. 11 is a block diagram that shows a first example of the structure of the blending process unit that is provided in the reproducing apparatus shown in FIG. 1.

Next, referring to FIG. 11, a first example of the structure of the blending process unit 30 is described.

The blending process unit 30, as shown in FIG. 11, includes a sync control unit 200, an RGBA-to-YUV conversion unit 201 and an α arithmetic unit 210.

The sync control unit 200 is a circuit for synchronizing a transfer operation for graphics data with alpha data (RGBA) by the GPU 120 with a transfer operation for main video data (YUV) by the video decoder 25 in units of a screen (frame or field) on a pixel-by-pixel basis.

The GPU 120 operates in sync with a pixel clock signal (Pixel Clock) and a vertical sync signal (Vsync), and outputs graphics data with alpha data (RGBA) in sync with the pixel clock signal (Pixel Clock) and vertical sync signal (Vsync). Specifically, the GPU 120 begins to output graphics data with alpha data (RGBA), which corresponds to a first pixel of each screen, in sync with the vertical sync signal (Vsync), and successively outputs graphics data with alpha data (RGBA), which corresponds to each of pixel groups in each screen, in sync with the pixel clock signal (Pixel Clock).

The pixel clock signal is output from a pixel clock generator (PLL: Phase-Locked Loop) 300. The pixel clock signal is supplied to the GPU 120 and video decoder 25.

The vertical sync signal (Vsync) is output from a clock generator that is provided within the GPU 120. This clock generator operates in sync with the pixel clock signal. The GPU 120 outputs a vertical sync signal (Vsync) and a horizontal sync signal (Hsync) to the outside.

The sync control unit 200 delivers the vertical sync signal (Vsync) from the GPU 120 to the video decoder 25 so that the GPU 120 may function as a master and the video decoder 25 may function as a slave that operates in sync with the vertical sync signal (Vsync) from the GPU 120.

Thereby, the video decoder 25 operates in sync with the same pixel clock signal and vertical sync signal as the GPU 120, and outputs video data (YUV) in sync with the pixel clock signal and vertical sync signal. Specifically, the video decoder 25 begins to output video data (YUV), which corresponds to a first pixel of each screen, in sync with the vertical sync signal (Vsync) that has been received from the GPU 120, and successively outputs video data (YUV), which corresponds to each of pixel groups in each screen, in sync with the pixel clock signal (Pixel Clock).

By feeding the vertical sync signal from the GPU 120 back to the GPU 120, it becomes possible to synchronize a transfer operation for graphics data with alpha data (RGBA) by the GPU 120 with a transfer operation for main video data (YUV) by the video decoder 25 in units of a screen (frame or field) on a pixel-by-pixel basis. Therefore, without providing a buffer circuit, for instance, within the blending process unit 30, it becomes possible to precisely blend the graphics data and video data on a pixel-by-pixel basis.

In a case where each of video data and graphics data is an interlace picture, the sync control unit 200 generates, in sync with the vertical sync signal that is output from the GPU 120, a field identifier (Field ID) that identifies whether a screen image that is currently to be output is a top field or a bottom field, and delivers the generated field identifier (Field ID) to the video decoder 25. Interlace picture signals are output in the order of a top field, a bottom field, a top field, a bottom field, . . . Thus, upon receiving the first vertical sync signal from the GPU 120, the sync control unit 200 generates a field identifier (Field ID=1) that is indicative of a top field. Subsequently, each time the sync control unit 200 receives a vertical sync signal from the GPU 120, the sync control unit 200 alternately outputs a field identifier (Field ID=0) indicative of a bottom field and a field identifier (Field ID=1) indicative of a top field. Thereby, it becomes possible to prevent occurrence of a field error between graphics data and video data.

The vertical sync signal from the GPU 120 may directly be input to the video decoder 25, without intervention of the sync control unit 200.

The RGBA-to-YUV conversion unit 201 converts the color space of the graphics data (RGB) of the graphics data with alpha data (RGBA), which is output from the GPU 120, from the RGB color space to the YUV color space, thereby generating graphics data with alpha data (YUVA) having the YUV color space. As the alpha data of the graphics data with alpha data (YUVA), the value that is added to the RGB data is used as such. The generated graphics data (YUVA) with alpha data is sent to the α arithmetic unit 210.

The α arithmetic unit 210 executes, on the YUV color space, an arithmetic operation (alpha blending arithmetic operation) for blending the graphics data (YUV) and video data (YUV) in units of a pixel, on the basis of the alpha data (A) of the graphics data with alpha data (YUVA). Thereby, the α arithmetic unit 210 generates output picture data (YUV).

As has been described above, in the blending process unit 30 of the present embodiment, the alpha blending arithmetic operation is executed not on the RGB color space, but on the YUV color space. Thus, since no color conversion is performed for the main video data (YUV) that is used as a main screen image, the real quality of HD-standard main video data is not degraded and a high-quality video output on which graphics data is overlaid can be obtained.

FIG. 12 shows a second example of the structure of the blending process unit 30.

In the structure shown in FIG. 12, the relationship between the master and the slave in FIG. 11 is reversed. Specifically, the sync control unit 200 delivers the vertical sync signal (Vsync) from the video decoder 25 to the GPU 120 so that the video decoder 25 may function as a master and the GPU 120 may function as a slave that operates in sync with the vertical sync signal (Vsync) from the video decoder 25. Thereby, the GPU 120 operates in sync with the same pixel clock signal and vertical sync signal as the video decoder 25, and outputs graphics data with alpha data (RGBA) in sync with the pixel clock signal and vertical sync signal.

The vertical sync signal from the video decoder 25 may directly be input to the GPU 120, without intervention of the sync control unit 200.

FIG. 13 shows a third example of the structure of the blending process unit 30.

The blending process unit 30 shown in FIG. 13 does not include the sync control unit 200. Instead of the sync control unit 200, a vertical sync signal generator 400, which is common to the video decoder 25 and GPU 120, is provided. Thereby, each of the video decoder 25 and GPU 120 operates in sync with a vertical sync signal that is output from the vertical sync signal generator 400 and a pixel clock signal that is output from the PLL 300. It is thus possible to synchronize a transfer operation for graphics data with alpha data (RGBA) with a transfer operation for main video data (YUV) in units of a screen (frame or field) on a pixel-by-pixel basis.

Figures 14, 15:
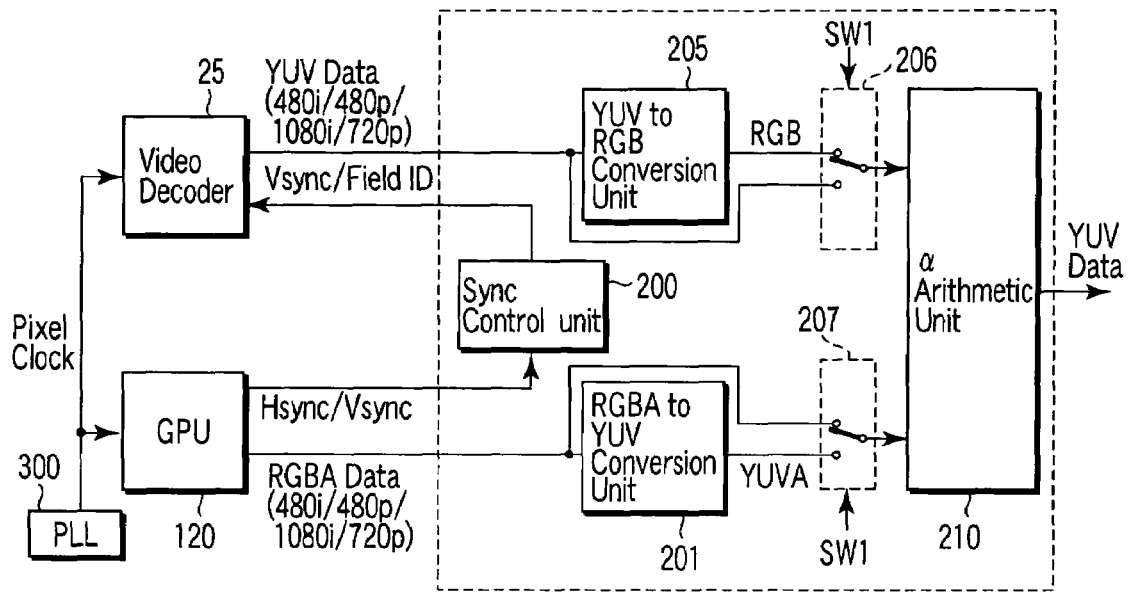
FIG. 14 is a block diagram that shows a fourth example of the structure of the blending process unit that is provided in the reproducing apparatus shown in FIG. 1.
FIG. 15 is a view for explaining color conversion and an α arithmetic operation, which are executed by the blending process unit provided in the reproducing apparatus shown in FIG. 1.

FIG. 14 shows a fourth example of the structure of the blending process unit 30.

In the blending process unit 30 shown in FIG. 14, a YUV-to-RGB conversion unit 205 and selectors 206 and 207 are provided in addition to the structure of the blending process unit 30 shown in FIG. 11.

The YUV-to-RGB conversion unit 205 converts the color space of main video data from the YUV color space to the RGB color space, and generates main video data of the RGB color space.

The selector 206 selects one of an input port and an output port of the YUV-to-RGB conversion unit 205, and connects the selected port to the α arithmetic unit 210. In the case where the selector 206 selects the output port of the YUV-to-RGB conversion unit 205, main video data of the RGB color space is supplied to the α arithmetic unit 210. On the other hand, in the case where the selector 206 selects the input port of the YUV-to-RGB conversion unit 205, main video data of the YUV color space bypasses the YUV-to-RGB conversion unit 205 and goes to the α arithmetic unit 210.

The selector 207 selects one of an input port and an output port of the RGBA-to-YUV conversion unit 201, and connects the selected port to the α arithmetic unit 210. In the case where the selector 207 selects the output port of the RGBA-to-YUV conversion unit 201, graphics data with alpha data (YUVA) of the YUV color space is supplied to the α arithmetic unit 210. On the other hand, if the selector 207 selects the input port of the RGBA-to-YUV conversion unit 201, graphics data with alpha data (RGBA) of the RGB color space bypasses the RGBA-to-YUV conversion unit 201 and goes to the α arithmetic unit 210.

The selection operations of the selectors 206 and 207 are commonly controlled by a switch signal SW1. The switch signal SW1 is generated, for example, from a control register that is provided in the south bridge 14, in which color conversion mode designation information is written by the CPU 11. The color conversion mode designation information designates one of a YUV blend mode for executing a blending process on the YUV color space and an RGB blend mode for executing a blending process on the RGB color space.

In the YUV blend mode, the selector 206 selects the input port of the YUV-to-RGB conversion unit 205, and the selector 207 selects the output port of the RGBA-to-YUV conversion unit 201. Thereby, graphics data and main video data are blended on the YUV space.

In the RGB blend mode, the selector 206 selects the output port of the YUV-to-RGB conversion unit 205, and the selector 207 selects the input port of the RGBA-to-YUV conversion unit 201. Thereby, graphics data and main video data are blended on the RGB space.

The selection of the YUV blend mode/RGB blend mode can be executed in accordance with color conversion mode control information that is multiplexed in an HD-DVD stream. The color conversion mode control information is set, for example, on a scene-by-scene basis. The CPU 11 interprets the color conversion mode control information and instructs the YUV blend mode or RGB blend mode to the blending process unit 30. For example, the YUV blend mode is used in normal cases, and the YUV blend mode is switched to the RGB blend mode when the display mode is changed to the mode as illustrated in FIG. 7. As has been described above, by effecting dynamic switching between the YUV blend mode and the RGB blend mode, the blending process can be executed in the mode that is suited to a scene to be reproduced.

A GUI or an operation switch that enables the user to designate the YUV blend mode/RGB blend mode may be provided. Thereby, in accordance with the user's operation, the YUV blend mode/RGB blend mode switching may be forcibly executed. It is thus possible to obtain an output picture with an image quality that satisfies the taste of the user.

FIG. 15 shows arithmetic formulae for converting the RGB color space to the YUV color space, and arithmetic formulae for alpha blending that is executed on the YUV color space.

In the alpha blending on the YUV color space, too, the alpha data (A) that accompanies the graphics data of the RGB color space can be used as such.

FIG. 16 shows a fifth example of the structure of the blending process unit 30.

Video data that is output from the video decoder 25 is 4:2:2 format data in which a resolution of a chrominance signal is lower than a resolution of a luminance signal. On the other hand, graphics data that is output from the GPU 120 is RGB data. If the color space of the graphics data is converted from RGB color space to the YUV color space, the graphics data becomes 4:4:4 format YUV data in which the resolution of a luminance signal is equal to the resolution of a chrominance signal.

In order to obtain a high-quality output picture in which graphics data and video data are blended, the blending process unit 30 includes a 4:2:2-to-4:4:4 conversion unit 204. The 4:2:2-to-4:4:4 conversion unit 204 up-samples the YUV 4:2:2 format video data, and generates YUV 4:4:4 format video data. The YUV 4:4:4 format video data is sent to the α arithmetic unit 210.

Based on alpha data (A) of the graphics data with alpha data (YUVA), which is output from the RGBA-to-YUV conversion unit 201, the α arithmetic unit 210 executes an arithmetic operation (alpha blending arithmetic operation) for blending the graphics data (YUV 4:4:4) and video data (YUV 4:4:4) on a pixel-by-pixel basis, thereby generating YUV 4:4:4 format output picture data.

In the blending process unit 30, as described above, the video data is up-sampled so as to conform to the picture format of the graphics data, and then blended with the graphics data. Thereby, a high-quality output picture can be obtained.

FIG. 17 shows a sixth example of the structure of the blending process unit 30.

In the blending process unit 30 shown in FIG. 17, a 4:4:4-to-4:2:2 conversion unit 202 and selectors 208 and 209 are provided in addition to the structure of the blending process unit 30 shown in FIG. 16.

The 4:4:4-to-4:2:2 conversion unit 202 down-samples 4:4:4 format graphics data with alpha data (YUVA), which has been converted to the YUV color space by the RGBA-to-YUV conversion unit 201, thereby generating 4:2:2 format graphics data with alpha data (YUVA). In this case, the alpha data is not down-sampled and the alpha data has the same resolution as the luminance signal Y.

The selector 208 selects one of an input port and an output port of the 4:2:2-to-4:4:4 conversion unit 204, and connects the selected port to the α arithmetic unit 210. In the case where the selector 208 selects the output port of the 4:2:2-to-4:4:4 conversion unit 204, YUV 4:4:4 format main video data is supplied to the α arithmetic unit 210. On the other hand, if the selector 208 selects the input port of the 4:2:2-to-4:4:4 conversion unit 204, YUV 4:2:2 format main video data bypasses the 4:2:2-to-4:4:4 conversion unit 204 and goes to the α arithmetic unit 210.

The selector 209 selects one of an input port and an output port of the 4:4:4-to-4:2:2 conversion unit 202, and connects the selected port to the α arithmetic unit 210. In the case where the selector 209 selects the output port of the 4:4:4-to-4:2:2 conversion unit 202, YUV 4:2:2 format graphics data with alpha data is supplied to the α arithmetic unit 210. On the other hand, if the selector 209 selects the input port of the 4:4:4-to-4:2:2 conversion unit 202, YUV 4:4:4 format graphics data with alpha data bypasses the 4:4:4-to-4:2:2 conversion unit 202 and goes to the α arithmetic unit 210.

The selection operations of the selectors 208 and 209 are commonly controlled by a switch signal SW2. The switch signal SW2 is generated, for example, from a control register that is provided in the south bridge 14, in which color conversion mode designation information is written by the CPU 11. The color conversion mode designation information designates one of a 4:4:4 blend mode for blending YUV 4:4:4 format pictures and a 4:2:2 blend mode for blending YUV 4:2:2 format pictures.

In the 4:4:4 blend mode, the selector 208 selects the output port of the 4:2:2-to-4:4:4 conversion unit 204, and the selector 209 selects the input port of the 4:4:4-to-4:2:2 conversion unit 202. Thereby, YUV 4:4:4 format main video data and YUV 4:4:4 format graphics data are blended by the α arithmetic unit 210.

In the 4:2:2 blend mode, the selector 208 selects the input port of the 4:2:2-to-4:4:4 conversion unit 204, and the selector 209 selects the output port of the 4:4:4-to-4:2:2 conversion unit 202. Thereby, YUV 4:2:2 format main video data and YUV 4:2:2 format graphics data are blended by the α arithmetic unit 210.

The switching between the 4:4:4 blend mode and 4:2:2 blend mode can forcibly be effected by the user's operation of a GUI or an operation switch. YUV 4:2:2 format video signals are supported by many AV apparatuses, and have a high flexibility in application uses. On the other hand, YUV 4:4:4 format video signals have a higher quality than YUV 4:2:2 format video signals, but the types of AV apparatuses that support the YUV 4:4:4 format video signals are limited. Thus, by providing the function of switching between the 4:4:4 blend mode and 4:2:2 blend mode, it becomes possible to meet both the requirements for flexibility in use and image quality. The function of switching between the 4:4:4 blend mode and 4:2:2 blend mode may be used in combination with the function of switching between the YUV blend mode and RGB blend mode. In this case, only when the YUV blend mode is selected, can the switching between the 4:4:4 blend mode and 4:2:2 blend mode be executed.

The circuits for synchronization, which have been described with reference to FIG. 11 to FIG. 13, are also applicable to the structures shown in FIG. 16 and FIG. 17.

FIG. 18 shows a seventh example of the structure of the blending process unit 30.

In the blending process unit 30 shown in FIG. 18, a 4:4:4-to-4:2:2 conversion unit 211 is provided in addition to the sync control unit 200 and RGB-to-YUV conversion unit 201, which are shown in FIG. 11, and in addition to the 4:2:2-to-4:4:4 conversion unit 204, which is shown in FIG. 16.

Graphics data with alpha data (RGBA) from the GPU 120 is delivered to the RGBA-to-YUV conversion unit 201. The RGBA-to-YUV conversion unit 201 converts the color space of the graphics data (RGB) from the RGB color space to the YUV color space, thereby generating graphics data with alpha data (YUVA) having the YUV 4:4:4 format. As the alpha data, the value that is added to the RGB data is used as such. The generated graphics data (YUVA) is sent to the α arithmetic unit 210.

YUV 4:2:2 format video data from the video decoder 25 is delivered to the 4:2:2-to-4:4:4 conversion unit 204. The 4:2:2-to-4:4:4 conversion unit 204 up-samples the YUV 4:2:2 format video data, and generates YUV 4:4:4 format video data. The YUV 4:4:4 format video data is sent to the α arithmetic unit 210.

Based on alpha data (A) of the graphics data with alpha data (YUVA), the α arithmetic unit 210 executes an arithmetic operation (alpha blending arithmetic operation) for blending the graphics data (YUV 4:4:4) and video data (YUV 4:4:4) on a pixel-by-pixel basis, thereby generating YUV 4:4:4 format output picture data. The YUV 4:4:4 format output picture data is directly sent to the video encoder 40, or is down-sampled to a YUV 4:2:2 format in the 4:4:4-to-4:2:2 conversion unit 211 and then sent to the video encoder 40.

As has been described above, in the blending process unit 30, 4:4:4 format pictures are subjected to the blending process, and the obtained output picture is converted to the 4:2:2 format and is output. Thereby, a high-quality blended output picture is obtained, and the flexibility in application uses is enhanced.

As has been described above, in the HD-DVD player of the present embodiment, the graphics data of the RGB color space, which is output from the GPU 120, is converted to a YUV color space. The graphics data, which has been converted to the YUV color space, is laid on main video data of the YUV color space, which is output from the video decoder 25. By executing the blending process on the YUV color space, the video data and graphics data can be blended without degrading the image quality of the main video data.

As has been described above in detail, the video data and graphics data can be blended without degrading the image quality of the video data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A reproducing apparatus comprising:
   a graphics processing unit configured to output graphics data containing sub-video data of an RGB color space and further configured to output alpha data indicative of a degree of transparency of each pixel of the graphics data;
   a conversion unit configured to convert a color space of the graphics data with the alpha data from the RGB color space to the YUV color space, wherein the graphics data that is converted to the YUV color space comprises data of a first format in which the resolution of a luminance signal is equal to the resolution of a chrominance signal;
   a video decoder configured to output main video data of a YUV color space, wherein the main video data comprises data of a second format in which the resolution of a chrominance signal is lower than the resolution of a luminance signal;
   an up-sampling process unit configured to execute an up-sampling process for converting the main video data of the YUV color space, which is output from the video decoder, to data of the first format;
   a blending process unit configured to execute a blending process in which the graphics data that is converted to the YUV color space and the main video data of the YUV color space that is up-sampled to the first format are blended pixel by pixel on the YUV color space, wherein the blending process unit comprises a first down-sampling process unit configured to execute a down-sampling process for converting blended video data to the second format; and
   a picture data output unit configured to output picture data, which is obtained by the blending process, to a display apparatus.

2. The reproducing apparatus according to claim 1, wherein the blending process unit is configured to execute, based at least in part on the alpha data, an arithmetic operation for overlaying the graphics data that is converted to the YUV color space on the main video data of the YUV color space.

3. The reproducing apparatus according to claim 1, further comprising a conversion unit configured to convert a color space of the main video data from the YUV color space to the RGB color space,
   wherein the blending process unit is configured to execute, in a first mode, a blending process in which the graphics data that is converted to the YUV color space and the main video data of the YUV color space are blended on the YUV color space, and further configured to execute, in a second mode, a blending process in which the graphics data of the RGB color space and the main video data that is converted to the RGB color space are blended on the RGB color space.

4. The reproducing apparatus according to claim 1, further comprising a second down-sampling process unit that is configured to execute a down-sampling process for converting the graphics data that is converted to the YUV color space to data of the second format,
   wherein the blending process unit is configured to execute, in a first mode, a blending process for blending the graphics data that is converted to the YUV color space and the main video data that is up-sampled to the first format, and to execute, in a second mode, a blending process for blending the graphics data that is down-sampled to the second format and the main video data of the second format.

5. A reproducing apparatus comprising:
   a separation unit configured to separate, from a motion picture stream comprising compression-encoded video data and compression-encoded graphics data, which is read out of a storage medium, the compression-encoded video data and the compression-encoded graphics data;
   a first decoding unit configured to decode the separated graphics data;
   a graphics processing unit configured to generate graphics data containing sub-video data of an RGB color space, which forms a first screen image, based at least in part on a decoded result of the first decoding unit, output the generated graphics data of the RGB color space, and output alpha data indicative of a degree of transparency of each pixel of the graphics data;
   a conversion unit configured to convert the color space of the graphics data with the alpha data, which is output from the graphics processing unit, from the RGB color space to the YUV color space, thereby generating graphics data with alpha data having the YUV color space, wherein the graphics data that is converted to the YUV color space comprises data of a first format in which the resolution of a luminance signal is equal to the resolution of a chrominance signal;
   a second decoding unit that decodes the separated video data, generates main video data of a YUV color space, which forms a second screen image, and outputs the generated main video data of the YUV color space, wherein the main video data comprises data of a second format in which the resolution of a chrominance signal is lower than the resolution of a luminance signal;
   an up-sampling process unit configured to execute an up-sampling process for converting the main video data of the YUV color space to data of the first format;
   a blending process unit configured to execute a blending process in which the graphics data that is converted to the YUV color space and the main video data of the YUV color space, that is up-sampled to the first format are blended pixel by pixel on the YUV color space using at least in part the alpha data, wherein the blending process unit comprises a first down-sampling process unit configured to execute a down-sampling process for converting blended video data to the second format; and
   a picture data output unit configured to output picture data, which is obtained by the blending process, to a display apparatus.

6. The reproducing apparatus according to claim 5, wherein the blending process unit is further configured to execute, based at least in part on the alpha data, an arithmetic operation for overlaying the graphics data that is converted to the YUV color space on the main video data of the YUV color space.

7. The reproducing apparatus according to claim 6, further comprising a conversion unit configured to convert a color space of the main video data, which is output from the second decoding unit, from the YUV color space to the RGB color space,
    wherein the blending process unit is configured to execute, in a first mode, a blending process in which the graphics data that is converted to the YUV color space and the main video data of the YUV color space are blended on the YUV color space, and to execute, in a second mode, a blending process in which the graphics data of the RGB color space and the main video data that is converted to the RGB color space are blended on the RGB color space.

8. The reproducing apparatus according to claim 5, further comprising a second down-sampling process unit configured to execute a down-sampling process for converting the graphics data that is converted to the YUV color space to data of the second format,
    wherein the blending process unit is further configured to execute, in a first mode, a blending process for blending the graphics data that is converted to the YUV color space and the main video data that is up-sampled to the first format, and to execute, in a second mode, a blending process for blending the graphics data that is down-sampled to the second format and the main video data of the second format.

\* \* \* \* \*